(12) United States Patent
Koyama et al.

(10) Patent No.: US 7,008,471 B2
(45) Date of Patent: Mar. 7, 2006

(54) FILTER AND CANISTER HAVING THE SAME

(75) Inventors: Nobuhiko Koyama, Nagoya (JP); Hideaki Itakura, Nagoya (JP)

(73) Assignees: Denso Corporation, (JP); Nippon Soken, Inc., (JP)

( * ) Notice: Subject to any disclaimer, the term of this patent is extended or adjusted under 35 U.S.C. 154(b) by 162 days.

(21) Appl. No.: 10/689,667

(22) Filed: Oct. 22, 2003

(65) Prior Publication Data
US 2004/0083894 A1    May 6, 2004

(30) Foreign Application Priority Data
Oct. 22, 2002    (JP)    ............... 2002-306748

(51) Int. Cl.
*B01D 53/04* (2006.01)
*F02M 33/02* (2006.01)

(52) U.S. Cl. ................ 96/131; 96/135; 96/136; 96/147; 96/153; 55/487; 123/519

(58) Field of Classification Search .......... 96/131–137, 96/139, 147, 149, 152–154; 123/518–520; 55/487
See application file for complete search history.

(56) References Cited

U.S. PATENT DOCUMENTS

| | | | |
|---|---|---|---|
| 2,843,341 A * | 7/1958 | Dannenberg et al. ....... 244/200 |
| 3,870,492 A * | 3/1975 | Guild ........................ 96/137 |
| 4,193,383 A * | 3/1980 | Rogers ...................... 123/520 |
| 4,203,401 A * | 5/1980 | Kingsley et al. ............ 123/520 |
| 4,306,894 A * | 12/1981 | Fukami et al. ............... 96/131 |
| 4,386,947 A * | 6/1983 | Mizuno et al. ............... 96/137 |
| 4,518,704 A * | 5/1985 | Okabayashi et al. .......... 502/80 |
| 4,683,862 A * | 8/1987 | Fornuto et al. ............. 123/520 |
| 4,684,382 A * | 8/1987 | Abu-Isa ...................... 96/134 |
| 4,836,172 A * | 6/1989 | Haruta et al. .............. 123/520 |
| 4,976,858 A * | 12/1990 | Kadoya ...................... 210/496 |
| 5,129,927 A * | 7/1992 | Tsubouchi ................... 96/113 |
| 5,173,095 A * | 12/1992 | Yasukawa et al. ............ 96/122 |
| 5,207,808 A * | 5/1993 | Haruta et al. ................ 96/131 |
| 5,501,198 A | 3/1996 | Koyama |
| 5,599,384 A * | 2/1997 | Yoshida et al. .............. 96/143 |
| 5,634,450 A | 6/1997 | Hara et al. |
| 5,641,344 A * | 6/1997 | Takahashi et al. ........... 96/139 |
| 5,653,788 A * | 8/1997 | Haruta ........................ 96/144 |
| 5,718,209 A * | 2/1998 | Scardino et al. ............ 123/519 |
| 5,743,943 A * | 4/1998 | Maeda et al. ................. 96/126 |

(Continued)

FOREIGN PATENT DOCUMENTS

JP    55-76453    10/1980

(Continued)

*Primary Examiner*—Robert H. Spitzer
(74) *Attorney, Agent, or Firm*—Nixon & Vanderhye PC

(57) ABSTRACT

A canister is connected to a fuel tank to adsorb fuel vapor vaporized in the fuel tank and includes a canister housing and a canister main body, which is received in the canister housing and communicates with the fuel tank at one end. The canister housing includes an atmospheric port and a filter chamber, and the filter chamber receives a filter and communicates between the other end of the canister main body and the atmospheric port, which in turn communicates with the atmosphere. The filter includes an active carbon part, an atmosphere-side unwoven fabric and a tank-side unwoven fabric. The active carbon part includes active carbon granules, which adsorb fuel vapor vaporized in the fuel tank. The atmosphere-side unwoven fabric and the tank-side unwoven fabric sandwich the active carbon part therebetween in a flow direction of air, which passes through the active carbon part.

10 Claims, 7 Drawing Sheets

U.S. PATENT DOCUMENTS

| | | | |
|---|---|---|---|
| 6,047,687 A * | 4/2000 | Ishikawa et al. | 123/518 |
| 6,460,516 B1 | 10/2002 | Kimoto et al. | |
| 6,464,761 B1 * | 10/2002 | Bugli | 96/135 |
| 6,503,301 B1 * | 1/2003 | Uchino et al. | 96/132 |
| 6,551,388 B1 * | 4/2003 | Oemcke et al. | 96/149 |
| 6,773,491 B1 * | 8/2004 | Bohl | 96/130 |
| 2001/0020418 A1 * | 9/2001 | Yamafuji et al. | 96/130 |
| 2001/0039881 A1 * | 11/2001 | Moriyama et al. | 96/139 |
| 2002/0020398 A1 * | 2/2002 | Kimoto et al. | 123/519 |
| 2002/0078931 A1 * | 6/2002 | Makino et al. | 123/519 |
| 2002/0124732 A1 * | 9/2002 | Hara et al. | 96/131 |
| 2003/0145731 A1 * | 8/2003 | Biasio | 96/130 |
| 2004/0007135 A1 * | 1/2004 | Ikuma et al. | 96/135 |
| 2004/0206240 A1 * | 10/2004 | Oh et al. | 96/135 |

FOREIGN PATENT DOCUMENTS

| | | |
|---|---|---|
| JP | 60-14269 | 1/1985 |
| JP | 5-33734 | 2/1993 |
| JP | 6-241131 | 8/1994 |
| JP | 7-238874 | 9/1995 |
| JP | 9-21361 | 1/1997 |
| JP | 2002-256989 | 9/2002 |
| JP | 2003-3914 | 1/2003 |
| WO | WO 94/03719 A1 * | 2/1994 |

* cited by examiner

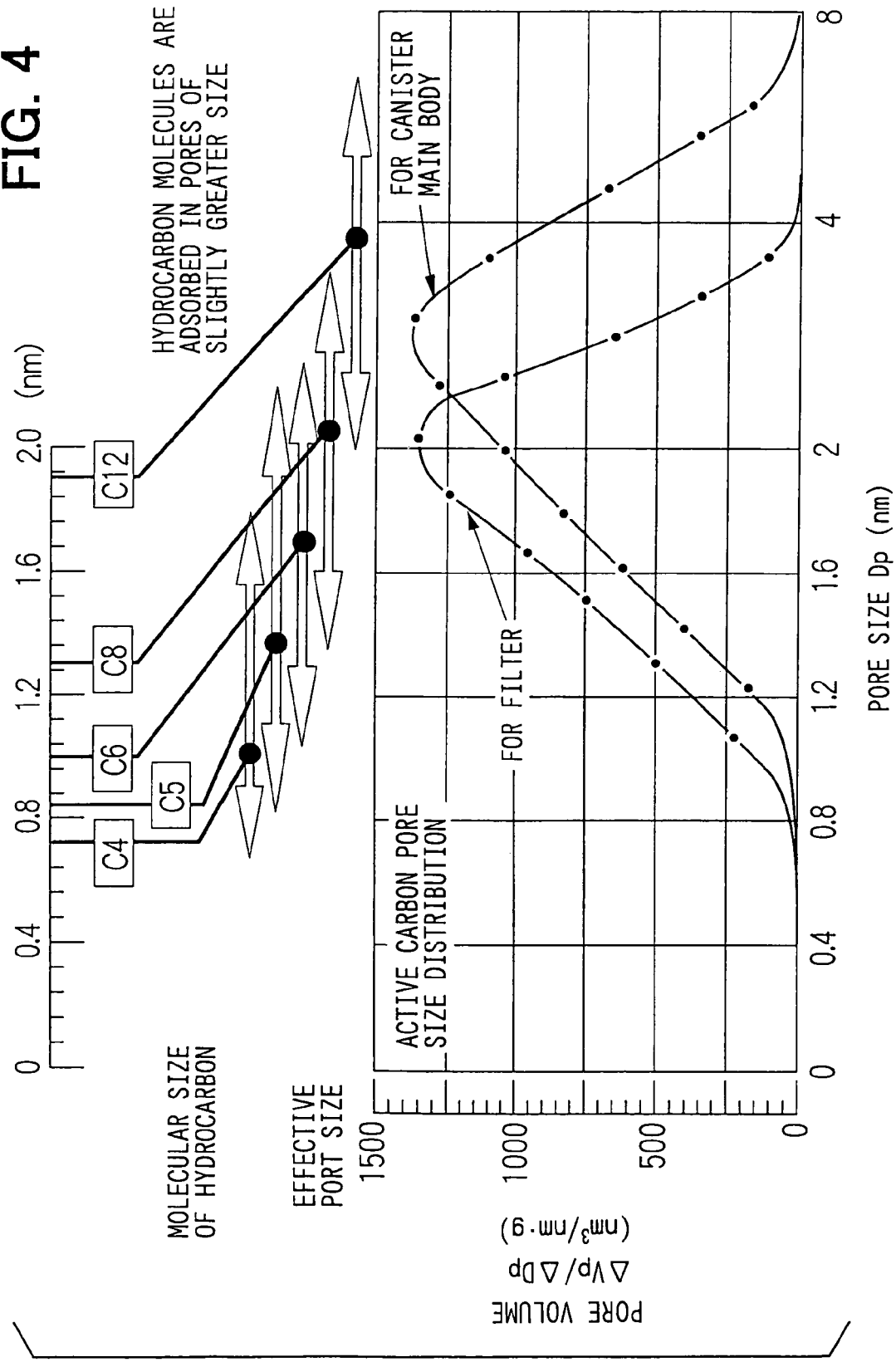

TO FUEL TANK ←    → TO ATMOSPHERIC PORT

FILTER AND CANISTER HAVING THE SAME

CROSS REFERENCE TO RELATED APPLICATION

This application is based on and incorporates herein by reference Japanese Patent Application No. 2002-306748 filed on Oct. 22, 2002.

BACKGROUND OF THE INVENTION

1. Field of the Invention

The present invention relates to a canister for adsorbing fuel vapor vaporized in a fuel tank and a filter for the canister.

2. Description of Related Art

A fuel vapor processing apparatus is provided in a vehicle, which has an internal combustion engine (hereinafter, referred to as an engine), to remove fuel vapor generated in a fuel tank or in the engine and thereby to reduce the fuel vapor released into the atmosphere. In the fuel vapor processing apparatus, a canister is arranged in a passage, which connects between the fuel tank and an intake pipe of the engine, to adsorb and remove fuel vapor vaporized in the fuel tank and the engine. The air, which contains fuel vapor vaporized in the fuel tank and the engine, is released into the atmosphere through the canister. Thus, the fuel vapor is removed from the air, so that the amount of fuel vapor released into the atmosphere is reduced. At the time of operating the engine, the atmospheric air is introduced into the canister. Thus, the fuel vapor adsorbed by the canister is desorbed from the canister and is supplied into the intake pipe together with the atmospheric air introduced into the canister.

As described above, the atmospheric air is introduced into the canister. Thus, a filter for filtering foreign particles is arranged in an atmospheric air passage, which connects between the canister and the atmosphere (see Japanese Unexamined Patent Publication Number 7-217506).

However, although the fuel vapor is mostly removed from the air when it passes through the canister, the fuel vapor cannot be completely removed from the air. This is due to the fact that the fuel vapor contains components, which are difficult to remove by the adsorbent material of the canister. Particularly lately, it has been demanded to further reduce the amount of fuel vapor released from the fuel tank into the atmosphere. Thus, it is required to reduce the amount of vapor fuel, which passes through the canister.

SUMMARY OF THE INVENTION

The present invention addresses the above disadvantage. Thus, it is an objective of the present invention to provide a filter of a canister, which allows a further reduction in the amount of fuel vapor released into the atmosphere. It is another objective of the present invention to provide a canister, which includes such a filter.

To achieve the objectives of the present invention, there is provided a filter for a canister that is connected to a fuel tank to adsorb fuel vapor vaporized in the fuel tank and includes a canister housing and a canister main body, which is received in the canister housing and communicates with the fuel tank at one end. The canister housing includes an atmospheric port and an atmospheric air passage, and the atmospheric air passage receives the filter and communicates between the other end of the canister main body and the atmospheric port, which in turn communicates with the atmosphere. The filter includes an active carbon layer and first and second holding layers. The active carbon layer includes an active carbon material, which adsorbs fuel vapor vaporized in the fuel tank. The first and second holding layers sandwich the active carbon layer therebetween in a flow direction of air, which passes through the active carbon layer.

To achieve the objectives of the present invention, there is also provided a canister having the above-described filter.

BRIEF DESCRIPTION OF THE DRAWINGS

The invention, together with additional objectives, features and advantages thereof, will be best understood from the following description, the appended claims and the accompanying drawings in which:

FIG. 4 is a schematic diagram showing a pore size distribution of active carbon granules;

DETAILED DESCRIPTION OF THE INVENTION

Various embodiments of the present invention will be described with reference to the accompanying drawings.

(First Embodiment)

Figure 1:
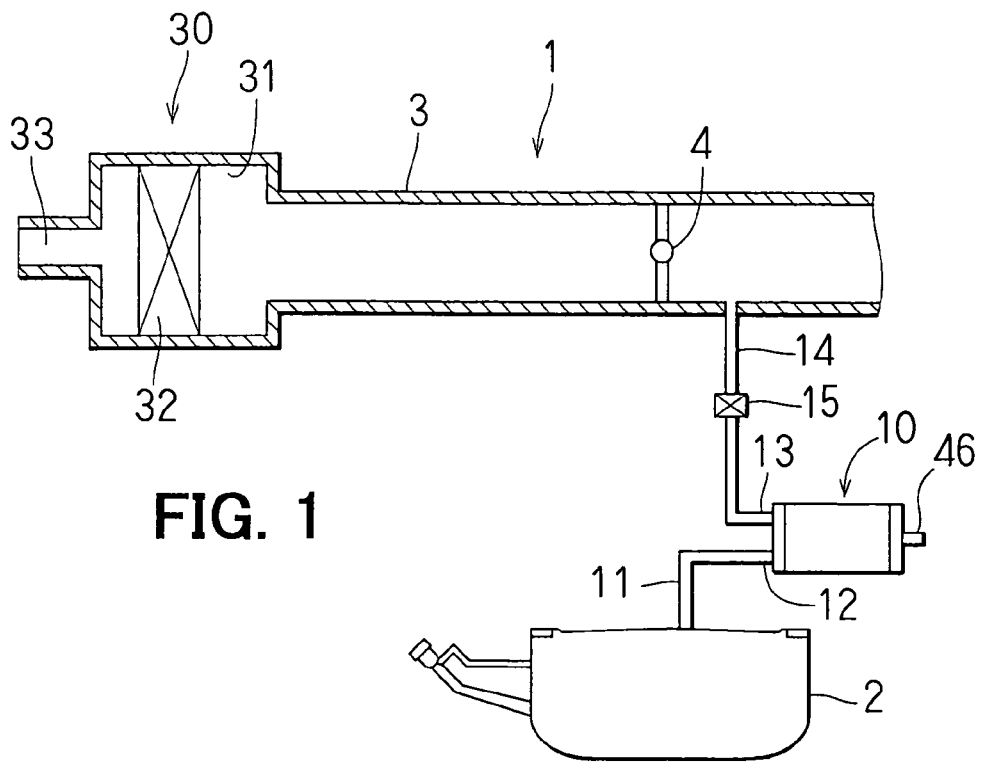
FIG. 1 is a schematic view of a fuel vapor processing apparatus according to a first embodiment of the present invention.

A fuel vapor processing apparatus, to which a canister of a first embodiment of the present invention is applied, will be described with reference to FIG. 1. The fuel vapor processing apparatus 1 includes a fuel vapor pipe 11. The fuel vapor pipe 11 has one end connected to a top of a fuel tank 2 and the other end connected to a fuel vapor port 12 of the canister 10 located at one end of the canister 10. The canister 10 has a purge port 13 in the one end, at which the fuel vapor port 12 is located. A purge pipe 14 is connected to the purge port 13 at one end. The other end of the purge pipe 14, which is opposite from the canister 10, is connected to a portion of an intake pipe 3 location downstream of a throttle valve 4 of the intake pipe 3. A purge valve 15 is inserted in the purge pipe 14. When the purge valve 15 receives a drive signal from an ECU (not shown) at the time of operation of the engine, the purge valve 15 is opened. Thus, during the operation of the engine, the fuel vapor adsorbed by the canister 10 is released from the canister 10 and is guided into the intake pipe 3 through the purge pipe 14. The intake pipe 3 is connected to an air cleaner 30. The air cleaner 30 forms an intake passage 31, which conducts intake air. An air cleaner element 32, which removes foreign particles (including debris, dust particles and the like) from the intake air, is arranged in the intake passage 31. The air cleaner 30 is opened to the atmosphere through an intake port 33.

Figure 2A:
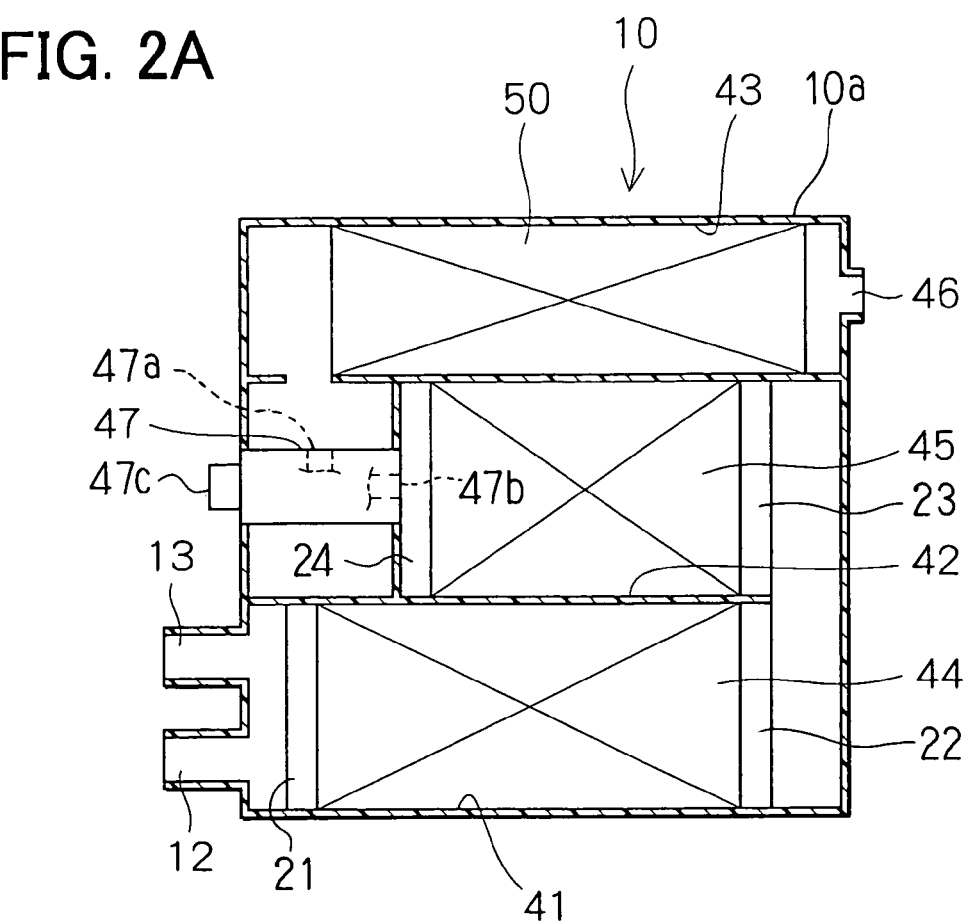
FIG. 2A is a schematic cross sectional view of a canister of the fuel vapor processing apparatus of the first embodiment.
Figure 2B:
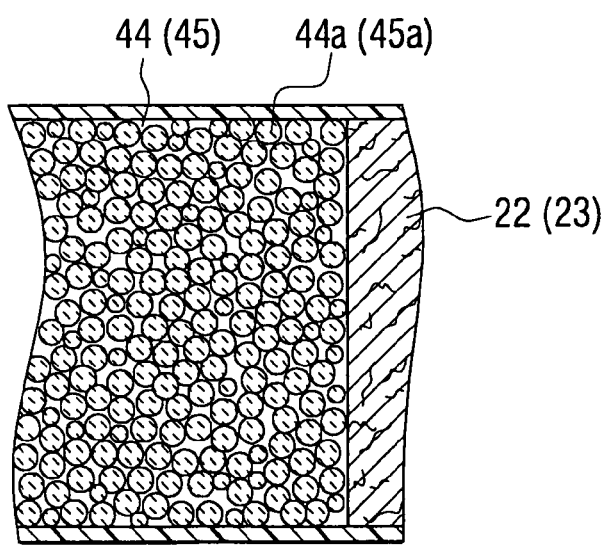
FIG. 2B is a schematic enlarged partial cross sectional view of an adsorbent material portion of the canister shown in FIG. 2A.

As shown in FIG. 2A, the canister 10 includes a canister housing 10*a*. The canister housing 10*a* includes a first receiving chamber 41 and a second receiving chamber 42. The canister housing 10*a* further includes a filter chamber 43, which serves as an atmospheric air passage communicated with the second receiving chamber 42. An adsorbent material portion 44 is received in the first receiving chamber 41, and an adsorbent material portion 45 is received in the second receiving chamber 42. In the first receiving chamber 41, the adsorbent material portion 44 is sandwiched between two adsorbent material holding filters 21, 22 made of an unwoven fabric material. More specifically, as shown in FIG. 2B, active carbon granules (serving as an active carbon material) 44*a* are filled between the adsorbent material holding filters 21, 22 in the first receiving chamber 41 to form the adsorbent material portion 44 and are clamped by the adsorbent material holding filters 21, 22, which are urged against the active carbon granules 44*a* by, for example, a spring (not shown). Similarly, active carbon granules (serving as an active carbon material) 45*a* are filled between adsorbent material holding filters 23, 24 made of the unwoven material in the second receiving chamber 42 to form the adsorbent material portion 45 and are clamped by the adsorbent material holding filters 23, 24, which are urged against the active carbon granules 45*a* by, for example, a spring (not shown). The canister housing 10*a* further includes an atmospheric port 46, which communicates with the atmosphere at one end and also communicates with the filter chamber 43 at the other end, as shown in FIG. 2A. A canister valve 47 is arranged between the atmospheric port 46 and the second receiving chamber 42 and is formed as a solenoid valve. More specifically, the canister valve 47 includes a connector 47*c*, which is connected to the ECU (not shown), and activation of the canister valve 47 is controlled by the ECU through the connector 47*c*. The canister valve 47 further includes a filter chamber side opening 47*a* and a second receiving chamber side opening 47*b*. When the canister valve 47 is opened, the filter chamber side opening 47*a* and the second receiving chamber side opening 47*b* are communicated to one another to communicate between the filter chamber 43 and the second receiving chamber 42. When the canister valve 47 is closed, the filter chamber side opening 47*a* and the second receiving chamber side opening 47*b* are disconnected from one another to disconnect between the filter chamber 43 and the second receiving chamber 42. The first and second receiving chambers 41, 42, the adsorbent material portions 44, 45 and the adsorbent material holding filters 21–24 cooperate together to serve as a canister main body of the present invention.

Figure 3:
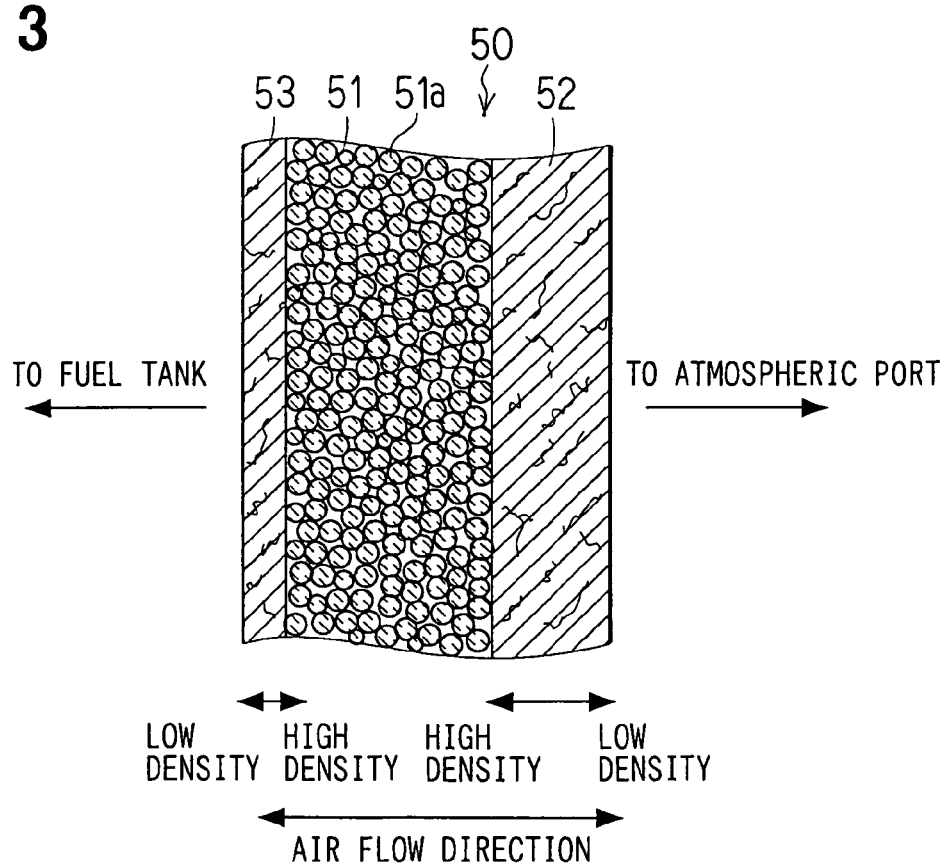
FIG. 3 is a schematic enlarged partial cross sectional view of a filter of the canister.

A filter 50 is received in the filter chamber 43. As shown in FIG. 3, the filter 50 includes unwoven fabrics (serving as first and second holding layers) 52, 53 and an active carbon part (serving as an active carbon layer, i.e., an adsorbent layer) 51. The active carbon part 51 includes a plurality of active carbon granules (serving as an active carbon material) 51*a*, which are adhered to one another by, for example, thinly applied adhesive to provide an integrated single body of active carbon granules 51*a*. It is preferred that when the active carbon granules 51*a* are adhered to one another, the adjacent active carbon granules 51*a* form a point contact therebetween, so that a space is provided between the adjacent active carbon granules 51*a* to allow flow of air therebetween. The holding layers include an atmosphere-side unwoven fabric 52 and a tank-side unwoven fabric 53. The atmosphere-side unwoven fabric 52 is located on an atmospheric port 46 side of the active carbon part 51, and the tank-side unwoven fabric 53 is located on a fuel tank 2 side of the active carbon part 51. The atmosphere-side unwoven fabric 52 and the tank-side unwoven fabric 53 sandwich the active carbon part 51 therebetween in an air flow direction. Here, the air flow direction refers to a flow direction of atmospheric air introduced from the atmospheric port 46 to the second receiving chamber 42 or a flow direction of air guided from the second receiving chamber 42 to the atmospheric port 46. The atmosphere-side unwoven fabric 52, the tank-side unwoven fabric 53 and the active carbon part 51 are joined together by, for example, adhesive applied therebetween. Each of the atmosphere-side unwoven fabric 52 and the tank-side unwoven fabric 53 has a fiber density gradient in the air flow direction. That is, each of the atmosphere-side unwoven fabric 52 and the tank-side unwoven fabric 53 has an increasing fiber density, which is increased toward the active carbon part 51. By increasing the fiber density in an active carbon part 51 side of each of the atmosphere-side unwoven fabric 52 and the tank-side unwoven fabric 53, which is opposed to the active carbon part 51, it is possible to ease adhesion of the atmosphere-side unwoven fabric 52 and of the tank-side unwoven fabric 53 to the active carbon part 51. Furthermore, by increasing the fiber density in the active carbon part 51 side of each of the atmosphere-side unwoven fabric 52 and the tank-side unwoven fabric 53 in comparison to the other side of each of the atmosphere-side unwoven fabric 52 and the tank-side unwoven fabric 53, it is possible to limit or reduce falling or scattering of active carbon granules 51*a* of the active carbon part 51.

The atmosphere-side unwoven fabric 52 has a thickness, which is measured in the air flow direction, greater than that of the tank-side unwoven fabric 53. In this way, foreign particles, which are contained in the atmospheric air introduced from the atmospheric port 46 into the filter chamber 43, are effectively captured by the atmosphere-side unwoven fabric 52. Also, it should be noted that the foreign particles, which are contained in the atmospheric air introduced from the atmospheric port 46 into the filter chamber 43, can be effectively removed by increasing the fiber density of the atmosphere-side unwoven fabric 52 without increasing the thickness of the atmosphere side unwoven fabric 52. The tank-side unwoven fabric 53 limits or reduces falling or scattering of the active carbon granules 51*a* of the active carbon part 51 into the second receiving chamber 42. Thus, the tank-side unwoven fabric 53 is only required to have a thickness that is sufficient to hold the active carbon granules 51*a*. That is, the tank-side holding layer is not necessarily the unwoven fabric and can be a meshed fabric or the like. When the tank-side unwoven fabric 53 is thinned, a filtering capacity for filtering foreign particles can be increased without causing an increase in the pressure loss.

As shown in FIG. 4, the active carbon granules 51a of the active carbon part 51 have a peak of pore size distribution in a range of 1.6 nm to 2.8 nm measured by the nitrogen adsorption Cranston-Inkley (C-I) Method. Thus, the active carbon granules 51a of the active carbon part 51 has the peak of pore size distribution smaller than a peak of pore size distribution (i.e., a peak in a range of 2.8 nm to 3.5 nm) of the active carbon granules 44a, 45a of the adsorbent material portions 44, 45 of the canister 10. In FIG. 4, each of "C4–C6", "C8" and "C12" indicates a corresponding carbon number of hydrocarbon. Furthermore, molecular sizes of hydrocarbons, pore size ranges of pores of the active carbon granules that adsorb the hydrocarbons, and pore size distribution of the active carbon granules are illustrated in this order from top to bottom in FIG. 4. When the air, which contains fuel vapor vaporized in the fuel tank 2, passes the adsorbent material portions 44, 45 of the canister 10, the fuel vapor is mostly removed. However, it is difficult to completely remove the fuel vapor. Particularly, some hydrocarbons, which have relatively small carbon numbers, cannot be easily removed by the adsorbent material portions 44, 45 of the canister 10.

Although a majority of hydrocarbons contained in the fuel vapor (i.e., gasoline vapor) have a carbon number equal to or smaller than six, some hydrocarbons contained in the fuel vapor have a carbon number of 12 or the like. Thus, the pore sizes of the active carbon granules 44a, 45a of the adsorbent material portions 44, 45 of the canister 10 are set to achieve a predetermined adsorption performance irrespective of the carbon numbers, as shown in FIG. 4. However, in the case where the amount of hydrocarbons contained in the canister 10 is cumulatively increased for the active carbon granules 44a, 45a having the above-described pore size distribution, the carbohydrates having the relatively small carbon numbers, which are equal to or smaller than five, may not be sufficiently adsorbed by the active carbon granules 44a, 45a of the adsorbent material portions 44, 45.

Particularly lately, it has been demanded to further reduce fuel vapor released from the fuel tank 2 into the atmosphere. Thus, it is required to further reduce the fuel vapor released into the atmosphere after passing through the canister 10. It is conceivable to reduce the pore sizes of the active carbon granules 44a, 45a of the adsorbent material portions 44, 45 of the canister 10 to adsorb the hydrocarbons having the relatively small carbon numbers. However, when the pore sizes of the active carbon granules 44a, 45a of the adsorbent material portions 44, 45 are reduced, desorption of the adsorbed hydrocarbons from the active carbon granules 44a, 45a becomes difficult. This will result in shortened lifetime of the adsorbent material portions 44, 45 of the canister 10.

Thus, in the first embodiment, the hydrocarbons, which have the relatively small carbon numbers, are effectively adsorbed and are removed by the active carbon granules 51a of the active carbon part 51 of the filter 50, which have the peak of the pore size distribution smaller than that of the active carbon granules 44a, 45a of the adsorbent material portions 44, 45 of the canister 10. In this way, the amount of fuel vapor discharged into the atmosphere from the atmospheric port 46 can be advantageously reduced.

Figure 5:
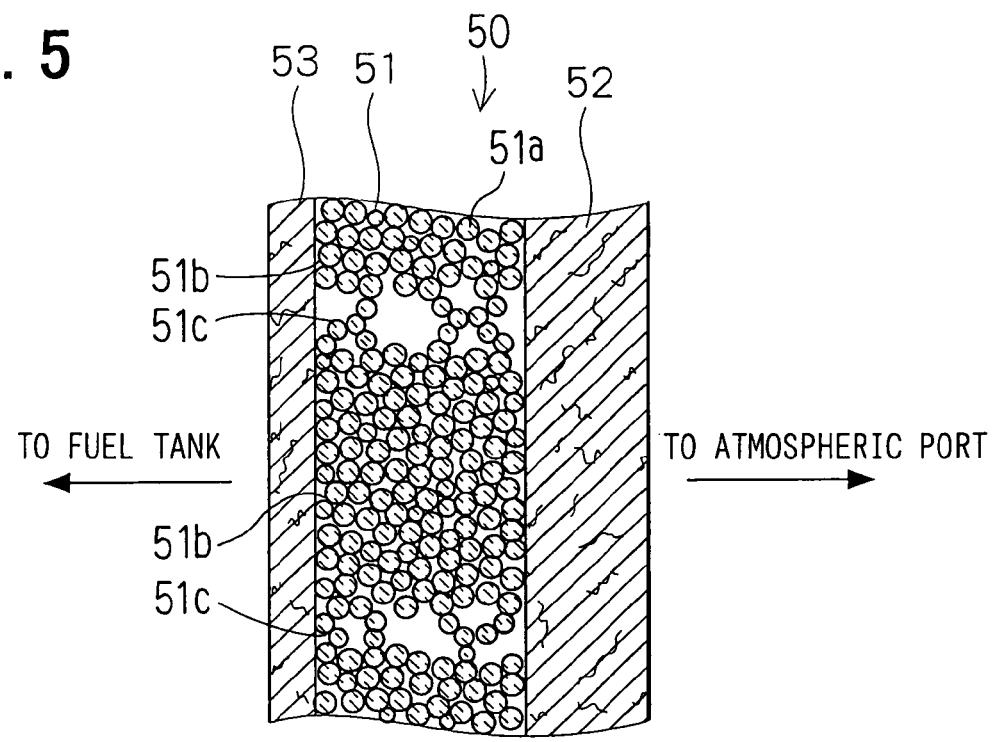
FIG. 5 is a schematic enlarged partial cross sectional view of a modification of the filter of the canister of the first embodiment.

As shown in FIG. 3, the active carbon granules 51a of the active carbon part 51 of the filter 50 are evenly distributed in the direction generally perpendicular to the air flow direction. Alternatively, as shown in FIG. 5, the active carbon granules 51a can be distributed such that high density sections 51b of the active carbon granules 51a and low density sections 51c of the active carbon granules 51a are alternately arranged in the direction generally perpendicular to the air flow direction. In the high density section 51b, the active carbon granules 51a are arranged to have a high granule density (first granule density). In the low density section 51c, the active carbon granules 51a are arranged to have a low granule density (second granule density) that is lower than the high granule density. In the low density sections 51c, the pressure loss is reduced at the time of flowing the atmospheric air through the filter 50 in comparison to the high density sections 51b. Thus, the atmospheric air introduced from the atmospheric port 46 into the filter chamber 43 can easily pass the low density sections 51c of the active carbon granules 51a. At this time, the atmospheric air introduced from the atmospheric port 46 passes through the atmosphere-side unwoven fabric 52, so that foreign particles contained in the atmospheric air are effectively removed by the atmosphere-side unwoven fabric 52. The air, which contains the fuel vapor that has passed the adsorbent material portions 44, 45, is moved mostly by diffusion and thus has a relatively small flow rate. Thus, even in the case of the above distribution where the high and low density sections 51b, 51c of the active carbon granules 51a are alternately provided, the air, which contains the fuel vapor, slowly passes the filter 50, so that the fuel vapor is adsorbed and is removed by the active carbon granules 51a of the active carbon part 51. Thus, by alternately providing the high and low density sections 51b, 51c of the active carbon granules 51a in the active carbon part 51 of the filter 50, the reduction of the pressure loss of the introduced atmospheric air can be balanced with the adsorption and removal of the fuel vapor.

Operation of the fuel vapor processing apparatus 1 will be described.

The fuel vapor vaporized in the fuel tank 2 is introduced into the canister 10 through the fuel vapor pipe 11. The fuel vapor introduced into the canister 10 is diffused in the canister 10, so that the fuel vapor introduced into the canister 10 is moved and is adsorbed by the adsorbent material portions 44, 45.

The air, which has passed the adsorbent material portions 44, 45 of the canister 10, is then introduced into the filter chamber 43 by diffusion. The air introduced into the filter chamber 43 contains the fuel vapor, which has not been adsorbed by the adsorbent material portions 44, 45. The flow rate of the air, which is guided through the filter chamber 43 and is released from the filter chamber 43 into the atmosphere through the atmospheric port 46, is relatively low, so that the air passes through the filter 50 at the low flow rate, and thus the fuel vapor contained in the guided air can be adsorbed and removed by the active carbon part 51 of the filter 50.

During the operation of the engine, the intake air is conducted through the intake pipe 3, so that the pressure in the intake pipe 3 is reduced in comparison to the atmospheric pressure. Thus, the atmospheric air is introduced from the atmospheric port 46 into the canister 10, which is communicated with the intake pipe 3 through the purge pipe 14. The atmospheric air introduced into the canister 10 from the atmospheric port 46 passes through the filter 50 of the filter chamber 43 and is supplied to the adsorbent material portions 44, 45, which are filled in the first receiving chamber 41 and the second receiving chamber 42, respectively. The atmospheric air introduced from the atmospheric port 46 passes through the filter 50, so that foreign particles contained in the atmospheric air are removed from the air by the atmosphere-side unwoven fabric 52 of the filter 50.

Furthermore, the fuel vapor adsorbed by the active carbon part 51 of the filter 50 is desorbed from the active carbon part 51 by the atmospheric air that passes through the filter 50. Similarly, when the introduced atmospheric air passes through the adsorbent material portions 44, 45, the fuel vapor adsorbed by the adsorbent material portions 44, 45 is desorbed from the adsorbent material portions 44, 45. The desorbed fuel vapor is introduced into the intake pipe 3 through the purge pipe 14 and is supplied into a corresponding combustion chamber of the engine along with the intake air.

In the first embodiment, as described above, the filter 50 includes the active carbon part 51. The pore sizes of the active carbon granules 51a of the active carbon part 51 of the filter 50 are set to the corresponding pore sizes that allow adsorption of the hydrocarbons, which have the relatively small carbon numbers. Thus, even when the fuel vapor contains the hydrocarbons, which have the relatively small carbon numbers and thus cannot be removed by the adsorbent material portions 44, 45 of the canister 10, such fuel vapor can be effectively adsorbed and removed by the active carbon part 51. As a result, it is possible to reduce the fuel vapor released into the atmosphere.

In the first embodiment, the filter 50 includes the holding layers, which include the atmosphere-side unwoven fabric 52 and the tank-side unwoven fabric 53. Furthermore, the atmosphere-side unwoven fabric 52 and the tank-side unwoven fabric 53 sandwich the active carbon part 51. In this way, the falling and scattering of the active carbon granules 51a of the active carbon part 51 are advantageously limited. Furthermore, the atmosphere-side unwoven fabric 52 removes foreign particles from the atmospheric air introduced from the atmospheric port 46. Thus, intrusion of the foreign particles into the adsorbent material portions 44, 45 of the canister 10 can be limited.

(Second Embodiment)

A canister of a fuel vapor processing apparatus according to a second embodiment of the present invention will be described with reference to FIG. 6. It should be understood that components similar to those discussed with reference to the first embodiment will be indicated by the same numerals and will not be described further.

Figure 6:
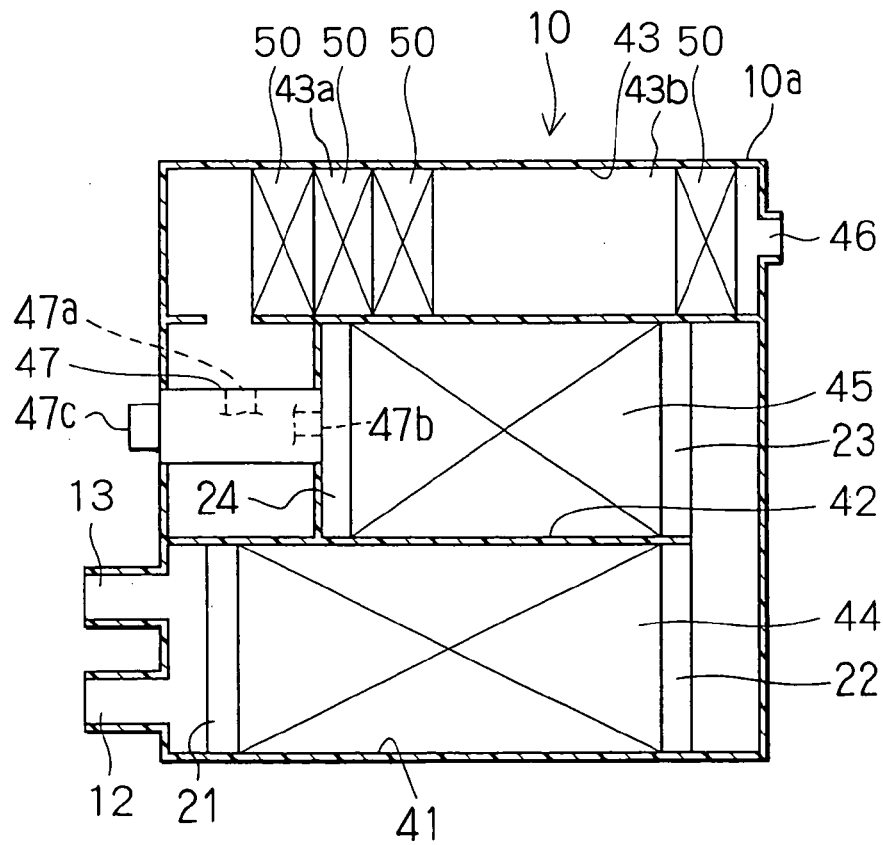
FIG. 6 is a schematic cross sectional view of a canister of a fuel vapor processing apparatus according to a second embodiment of the present invention.

In the second embodiment, as shown in FIG. 6, a plurality of filters 50 is provided in the filter chamber 43. A structure of each filter 50 is similar to that of the filter 50 of the first embodiment. The opposed ends of the active carbon part 51, which are opposed in the air flow direction, are sandwiched or clamped by the holding layers, which include the atmosphere-side unwoven fabric 52 and the tank-side unwoven fabric 53. The filters 50 are arranged one after the other in the air flow direction. Furthermore, the filters 50 are arranged to provide high and low density regions, which are arranged one after the other in the air flow direction. That is, the filter chamber 43 includes a high density filter region 43a and a low density filter region 43b. In the high density filter region 43a, the filters 50 are arranged to have a high filter density (first filter density). In the low density filter region 43b, the filters 50 are arranged to have a low filter density (second filter density) that is lower than that of the high filter density.

In the second embodiment, by stacking the filters 50, there is achieved the improved adsorption capacity of the canister 10 for adsorbing the fuel vapor, which cannot be adsorbed by the adsorbent material portions 44, 45 of the canister 10. Furthermore, there is also achieved the improved filtration capacity of the canister 10 for removing foreign particles from the atmospheric air introduced from the atmospheric port 46. By appropriately arranging the filters 50 into the high density region(s) and the low density region(s), it is possible to achieve the required fuel vapor adsorption capacity of the filters 50, the required filtration capacity of the filters 50 and the desired pressure loss of the filters 50. Furthermore, by appropriately changing the peak of pore size distribution of the active carbon granules 51a of the active carbon part 51 in each filter 50, the wider range of adsorption and removal of the fuel vapor can be achieved.

In the second embodiment, the filters 50 are arranged in the high density filter region 43a and in the low density filter region 43b. However, for example, the filters 50 can be arranged at equal intervals in the air flow direction or can be closely contacted to one another.

(Third Embodiment)

A canister of a fuel vapor processing apparatus according to a third embodiment of the present invention will be described with reference to FIG. 7. It should be understood that components similar to those discussed with reference to the first embodiment will be indicated by the same numerals and will not be described further.

Figure 7:
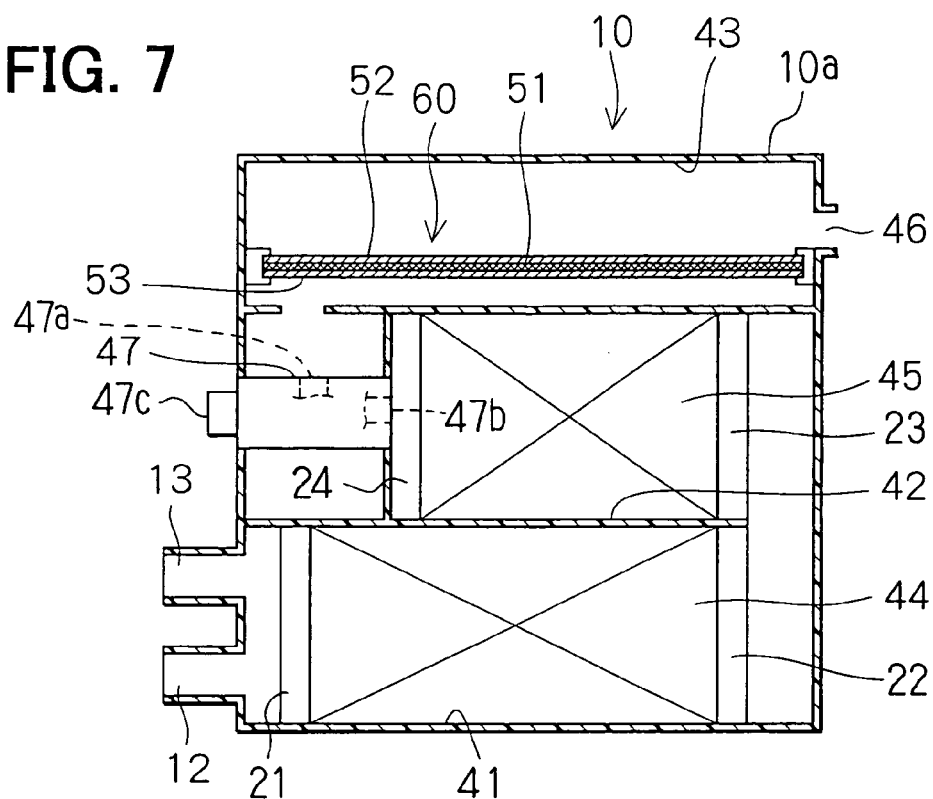
FIG. 7 is a schematic cross sectional view of a canister of a fuel vapor processing apparatus according to a third embodiment of the present invention.

In the third embodiment, as shown in FIG. 7, a filter 60 received in the filter chamber 43 is formed into a flat plate shape. Similar to the filter 50 of the first and second embodiments, the filter 60 includes the active carbon part 51, the atmosphere-side unwoven fabric 52 and the tank-side unwoven fabric 53, and the atmosphere-side unwoven fabric 52 and the tank-side unwoven fabric 53 sandwich the opposed ends of the active carbon part 51 opposed in the air flow direction (i.e., the top-bottom direction in FIG. 7). As described above, the flow rate of air, which contains the fuel vapor and is supplied to the filter 60 after passing through the adsorbent material portions 44, 45 of the canister 10, is relatively low. Thus, even when the filter 60 is thinned in the air flow direction, the fuel vapor can be sufficiently adsorbed and removed by the filter 60. Furthermore, by reducing the thickness of the filter 60 in the air flow direction, the pressure loss at the time of introducing the atmospheric air into the canister 10 can be reduced.

(Fourth Embodiment)

A canister of a fuel vapor processing apparatus according to a fourth embodiment of the present invention will be described with reference to FIG. 8. It should be understood that components similar to those discussed with reference to the first embodiment will be indicated by the same numerals and will not be described further.

Figure 8:
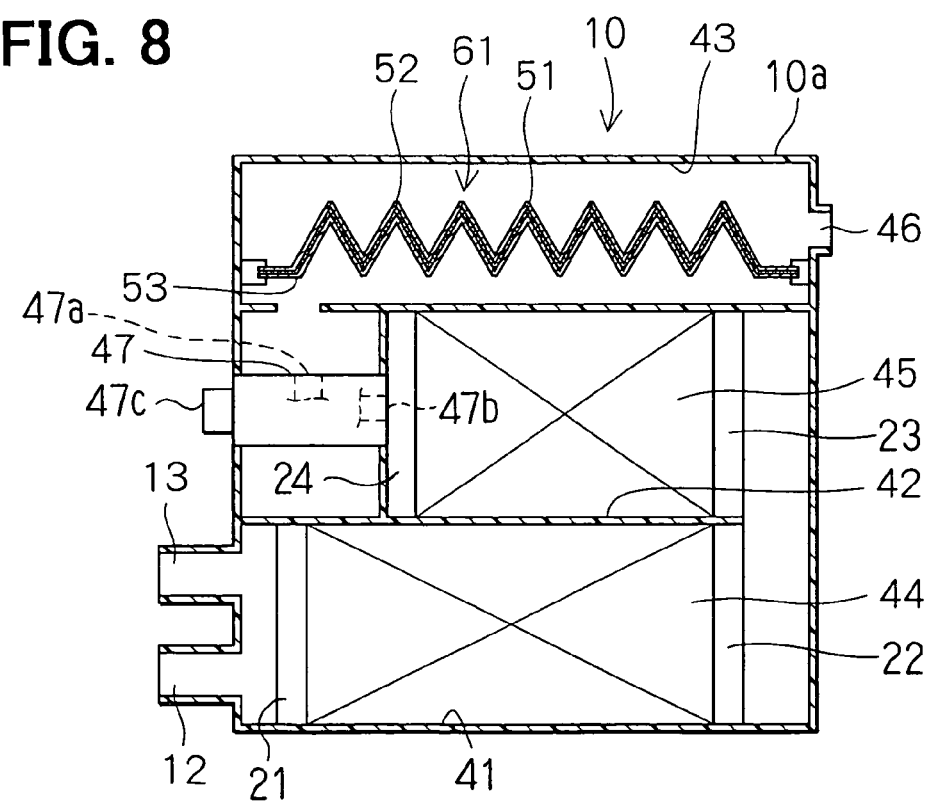
FIG. 8 is a schematic cross sectional view of a canister of a fuel vapor processing apparatus according to a fourth embodiment of the present invention.

In the fourth embodiment, as shown in FIG. 8, a filter 61 received in the filter chamber 43 has a zigzag shaped structure. The filter 61 of the fourth embodiment also includes the active carbon part 51, the atmosphere-side unwoven fabric 52 and the tank-side unwoven fabric 53. With this zigzag shaped structure of the filter 61, a surface area of the filter 61 is increased in comparison to the filter 60 of the third embodiment. Thus, the fuel vapor, which has passed through the canister 10, and the foreign particles, which are contained in the atmospheric air introduced from the atmospheric port 46, can be effectively removed. Furthermore, the pressure loss at the time of introducing the atmospheric air into the canister 10 can be reduced.

(Fifth Embodiment)

A canister of a fuel vapor processing apparatus according to a fifth embodiment of the present invention will be described with reference to FIGS. 9 and 10. It should be understood that components similar to those discussed with reference to the first embodiment will be indicated by the same numerals and will not be described further.

Figure 9:
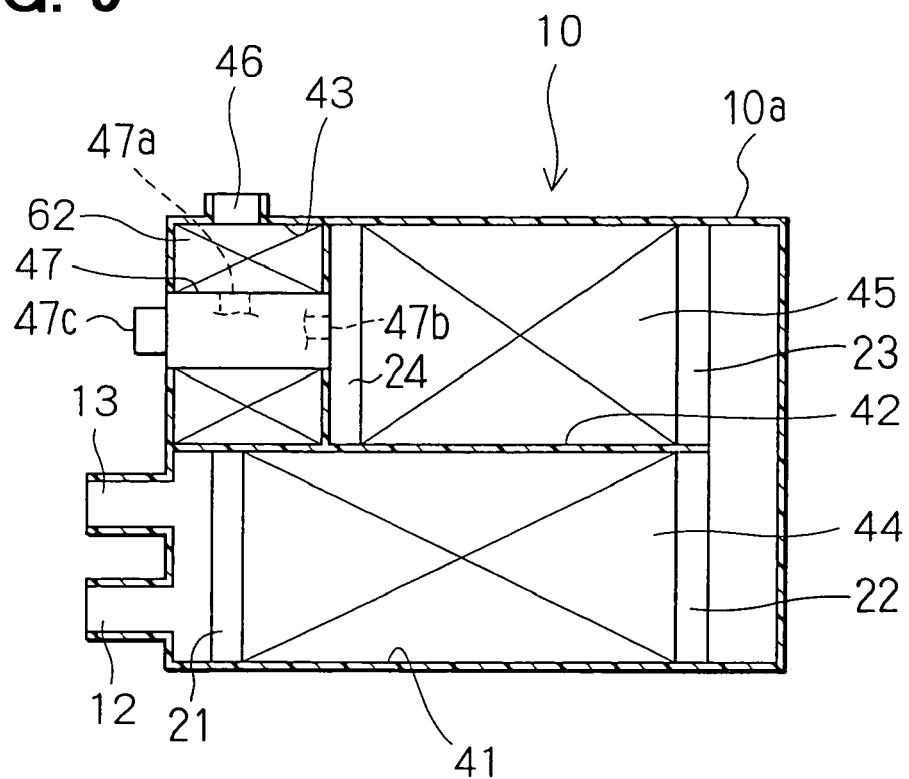
FIG. 9 is a schematic cross sectional view of a canister of a fuel vapor processing apparatus according to a fifth embodiment of the present invention.
Figure 10:
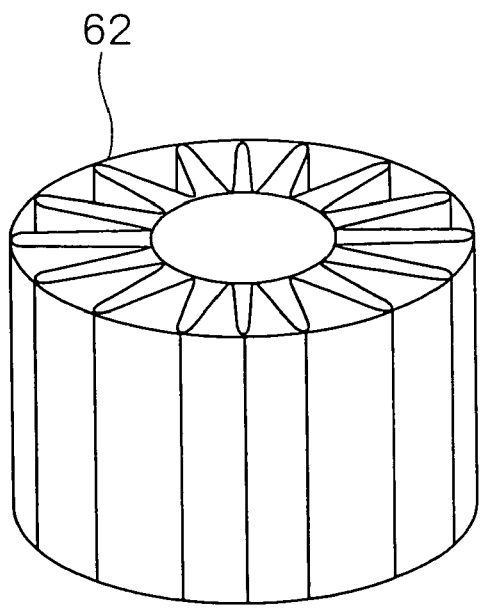
FIG. 10 is a schematic perspective view of a filter of the canister of the fifth embodiment.

In the fifth embodiment, as shown in FIG. 9, a filter 62 received in the filter chamber 43 surrounds the canister valve 47. In this case, the filter 62 is folded to have a star-shaped cross section, as shown in FIG. 10. In this way, a surface area of the filter 62 is increased. Thus, the fuel vapor, which has passed through the canister 10, and the foreign particles, which are contained in the atmospheric air introduced from the atmospheric port 46, can be effectively removed. Furthermore, the pressure loss at the time of introducing the atmospheric air can be reduced. Also, in the fifth embodiment, the filter 62 includes the atmosphere-side unwoven fabric and the tank-side unwoven fabric, which sandwich the active carbon part therebetween. The atmosphere-side unwoven fabric is arranged in a radially outer side of the filter 62, i.e., in the atmosphere-side of the filter 62, and the tank-side unwoven fabric is arranged in a radially inner side of the filter 62, i.e., is arranged in the canister valve 47 side of the filter 62.

(Sixth Embodiment)

Figure 11:
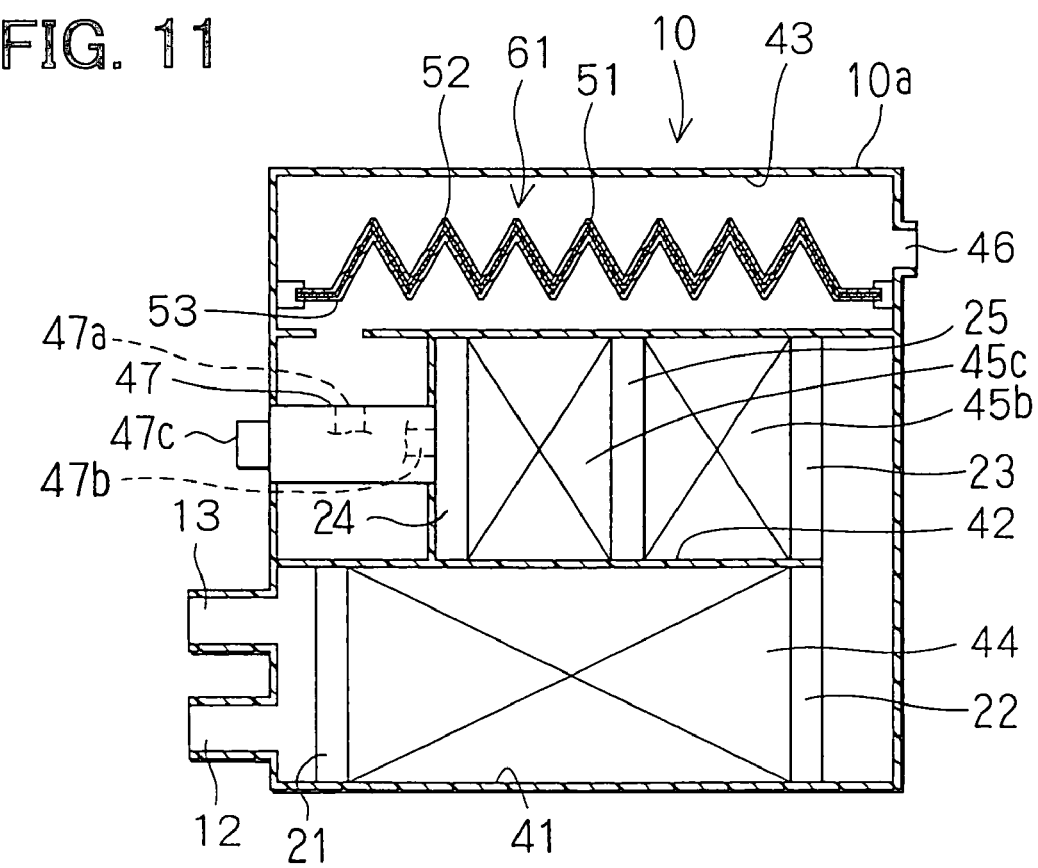
FIG. 11 is a schematic cross sectional view of a canister of a fuel vapor processing apparatus according to a sixth embodiment of the present invention.

A canister of a fuel vapor processing apparatus according to a sixth embodiment of the present invention will be described with reference to FIG. 11. The canister 10 of the sixth embodiment is similar to that of the fourth embodiment shown in FIG. 8 except the structure of the adsorbent material portion 45 received in the second receiving chamber 42. That is, the adsorbent material portion 45 is divided into a first adsorbent material sub-portion 45b and a second adsorbent material sub-portion 45c, and a separating filter 25 made of an unwoven material is interposed between the first sub-portion 45b and the second sub-portion 45c. Specifically, in the first sub-portion 45b, the active carbon granules 45a are filled between the adsorbent material holding filter 23 and the separating filter 25. In the second sub-portion 45c, the active carbon granules 45a are filled between the separating filter 25 and the adsorbent material holding filter 24. The first and second sub-portions 45b, 45c are clamped by the adsorbent material holding filters 23, 24, which are urged against the first and second sub-portions 45b, 45c by, for example, a spring (not shown).

With the above described structure, the canister 10 of the sixth embodiment can achieve the following advantage in addition to one discussed with reference to the fourth embodiment. That is, the fuel vapor, which has passed through the adsorbent material portion 44 received in the first receiving chamber 41, is first adsorbed by the first sub-portion 45b. When the fuel vapor, which has entered into the first sub-portion 45b, is diffused toward the second sub-portion 45c and reaches the separating filter 25, the diffusion of the fuel vapor is limited or reduced by the separating filter 25, which includes no adsorbent and thus serves as a buffering zone. Thus, in comparison to the adsorbent material portion 45 of the fourth embodiment shown in FIG. 8, the less amount of fuel vapor is diffused into the filter chamber 43. As a result, the above-described arrangement of the first and second sub-portions 45b, 45c divided by the separating filter 25 can further restrain the release of fuel vapor into the atmosphere.

Additional advantages and modifications will readily occur to those skilled in the art. The invention in its broader terms is therefore not limited to the specific details, representative apparatus, and illustrative examples shown and described.

What is claimed is:

1. A filter, for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the first holding layer is positioned on an atmosphere side of the active carbon layer;

the second holding layer is positioned on a fuel tank side of the active carbon layer;

at least the first holding layer, of the first and the second holding layers, is made of an unwoven fabric material that filters foreign particles contained in atmospheric air conducted in the atmospheric air passage; and a thickness of the first holding layer measured in the flow direction is greater than a thickness of the second holding layer measured in the flow direction.

2. A filter for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the first holding layer is positioned on an atmosphere side of the active carbon layer;

the second holding layer is positioned on a fuel tank side of the active carbon layer;

at least the first holding layer, of the first and the second holding layers, is made of an unwoven fabric material that filters foreign particles contained in atmospheric air conducted in the atmospheric air passage;

each of the first and second holding layers is made of the unwoven fabric material that filters foreign particles contained in atmospheric air conducted in the atmospheric air passage; and a fiber density of the first holding layer is greater than a fiber density of the second holding layer.

3. A filter for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the first holding layer is positioned on an atmosphere side of the active carbon layer;

the second holding layer is positioned on a fuel tank side of the active carbon layer;

at least the first holding layer, of the first and the second holding layers, is made of an unwoven fabric material that filters foreign particles contained in atmospheric air conducted in the atmospheric air passage;

each of the first and second holding layers is made of the unwoven fabric material that filters foreign particles contained in atmospheric air conducted in the atmospheric air passage; and one end of each of the first and second holding layers, which is positioned on an active carbon layer side of the holding layer, has a fiber density higher than that of the other end of each of the first and second holding layers.

4. A filter for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the active carbon material of the active carbon layer is in a form of active carbon granules; and the active carbon layer includes:

a high density section, in which the active carbon granules are arranged to have a first granule density; and a low density section, in which the active carbon granules are arranged to have a second granule density that is lower than the first granule density, wherein the high density section and the low density section are arranged one after the other in a direction perpendicular to the flow direction.

5. A filter for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the canister main body includes at least one adsorbent material portion, which includes an active carbon material; and a peak of pore size distribution of the active carbon material of the active carbon layer is smaller than a peak of pore size distribution of the active carbon material of the at least one adsorbent material portion.

6. A filter for a canister that is connected to a fuel tank to adsorb fuel vapor vaporized in the fuel tank and includes a canister housing and a canister main body, which is received in the canister housing and communicates with the fuel tank at one end, wherein the canister housing includes an atmospheric port and an atmospheric air passage, and the atmospheric air passage receives the filter and communicates between the other end of the canister main body and the atmospheric port, which in turn communicates with the atmosphere, the filter comprising:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

the active carbon material of the active carbon layer is in a form of active carbon granules; and the active carbon granules are adhered to one another by adhesive to integrate the active carbon granules into a single body.

7. A canister for adsorbing fuel vapor vaporized in a fuel tank, the canister comprising:

a canister housing that includes an atmospheric port and an atmospheric air passage;

a canister main body that is received in the canister housing and communicates with the fuel tank at one end, wherein the atmospheric air passage communicates between the other end of the canister main body and the atmospheric port, which in turn communicates with the atmosphere; and at least one filter that is received in the atmospheric air passage, wherein each filter includes:

an active carbon layer that includes an active carbon material, which adsorbs fuel vapor vaporized in the fuel tank; and first and second holding layers that sandwich the active carbon layer therebetween in a flow direction of air, which passes through the active carbon layer, wherein:

a peak of pore size distribution of the active carbon material of the active carbon layer of each filter, which is measured by nitrogen adsorption Cranston-Inkley Method, is in a range of 1.6 nm to 2.8 nm; and a peak of pore size distribution of the active carbon material of each adsorbent material portion, which is measured by nitrogen adsorption Cranston-Inkley Method, is in a range of 2.8 nm to 3.5 nm.

8. The canister according to claim 7, further comprising a canister valve arranged between the at least one filter and the canister main body.

9. A canister for adsorbing fuel vapor vaporized in a fuel tank, the canister comprising:

a canister housing that includes an atmospheric port and an atmospheric air passage;

a canister main body that is received in the canister housing and communicates with the fuel tank at one end, wherein the atmospheric air passage communicates between the other end of the canister main body and the atmospheric port, which in turn communicates with the atmosphere; and at least one filter that is received in the atmospheric air passage, wherein each filter includes:
- an active carbon layer that includes an active carbon material, which adsorbs fuel vapor vaporized in the fuel tank; and
- first and second holding layers that sandwich the active carbon layer therebetween in a flow direction of air, which passes through the active carbon layer, wherein the at least one filter includes a plurality of filters, which are arranged in the flow direction.

10. The canister according to claim 9, wherein the atmospheric air passage includes: a high density filter region, in which the filters are arranged to have a first filter density; and a low density filter region, in which the filters are arranged to have a second filter density that is lower than the first filter density.

* * * * *